United States Patent [19]

Yee et al.

[11] Patent Number: 4,858,947
[45] Date of Patent: Aug. 22, 1989

[54] FOLDING TANDEM SEAT BABY CARRIAGE

[75] Inventors: David T. Yee, Hacidena Heights; Eric Lin, Alhamra, both of Calif.

[73] Assignee: A B Oriental Trading Co., Inc., Los Angeles, Calif.

[21] Appl. No.: 113,260

[22] Filed: Oct. 26, 1987

[51] Int. Cl.$^4$ ............................................. B62B 7/08
[52] U.S. Cl. .................................... 280/643; 280/644; 280/658; 280/47.35; 280/47.4; 297/243
[58] Field of Search .............. 280/642, 643, 644, 648, 280/649, 650, 658, 47.38, 47.4; 297/DIG. 4, 243; 296/77.1

[56] References Cited

U.S. PATENT DOCUMENTS

| | | | |
|---|---|---|---|
| 1,842,159 | 1/1932 | Fleishman et al. | 296/63 |
| 2,872,203 | 2/1959 | Hedstrom | 280/643 |
| 3,248,125 | 4/1966 | Gill | 280/643 X |
| 3,309,101 | 3/1967 | Romay | 280/47.38 |
| 3,330,575 | 7/1967 | Boudreau | 280/648 |
| 4,506,907 | 3/1985 | Miyagi | 280/642 |
| 4,529,219 | 7/1985 | Shamie | 280/642 |
| 4,542,915 | 9/1985 | Wheeler, III et al. | 280/642 |
| 4,597,116 | 7/1986 | Kassai | 5/99 A |
| 4,660,850 | 4/1987 | Nakao et al. | 280/642 |

FOREIGN PATENT DOCUMENTS 13671 of 1911 United Kingdom ................ 280/642

Primary Examiner—Charles A. Marmor
Assistant Examiner—Brian L. Johnson
Attorney, Agent, or Firm—Sheldon & Mak

[57] ABSTRACT

A foldable tandem seat baby carriage including a pair of wheeled front legs, a pair of wheeled rear legs, and, in the operative position, two pairs of horizontal longitudinal bars extending between the legs. A U-shaped push handle connects pivotally with the rear of the upper bars, and the free ends of the push handle substantially abut the rear legs about midway along their length. Locking means interengage the push handle with the rear legs in the extended position and bars in the horizontal position to provide tandem multiple seat construction. Release of the lock by foot pressure on a transverse bar extending between the rear legs causes the push handle to move downwardly and forwardly and the two legs to collapse and fold towards each other to be substantially parallel with the push bar in the folded position. The two pairs of parallel longitudinal bars collapse to be substantially parallel towards each other in the folded position. A single action thereby permits folding of the tandem carriage into the folded position. From a folded position, a similar single action provides unfolding to the extended position.

22 Claims, 2 Drawing Sheets

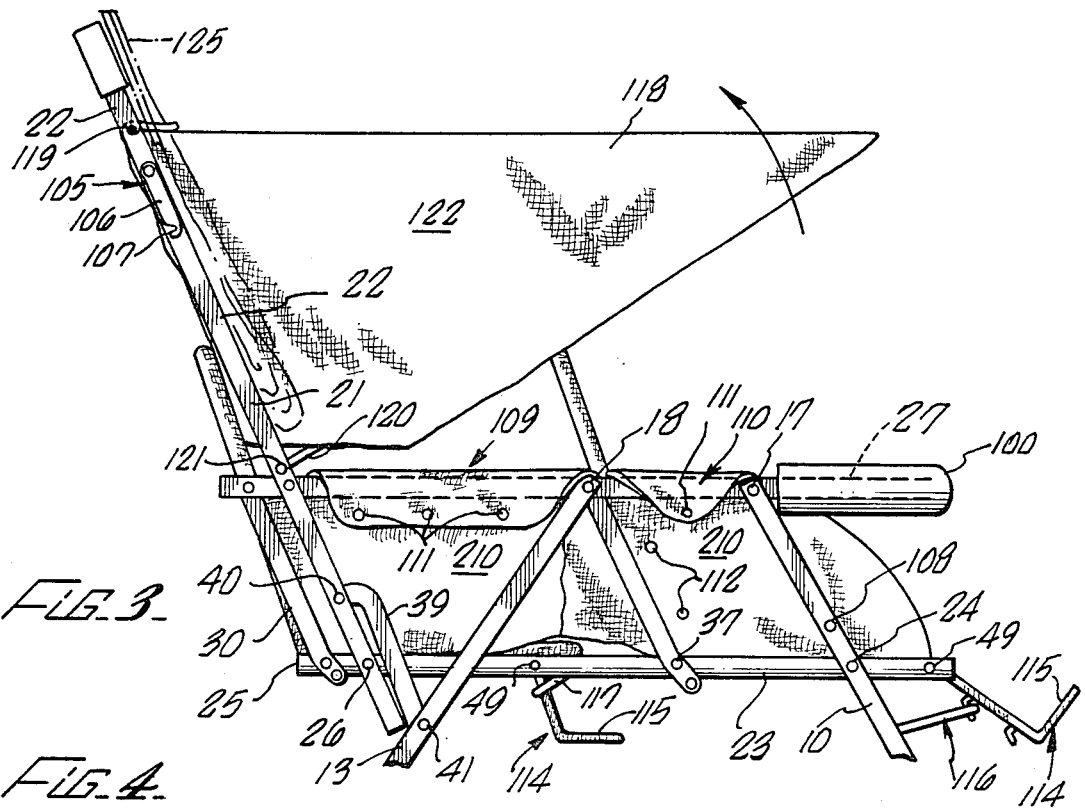
FIG. 3.
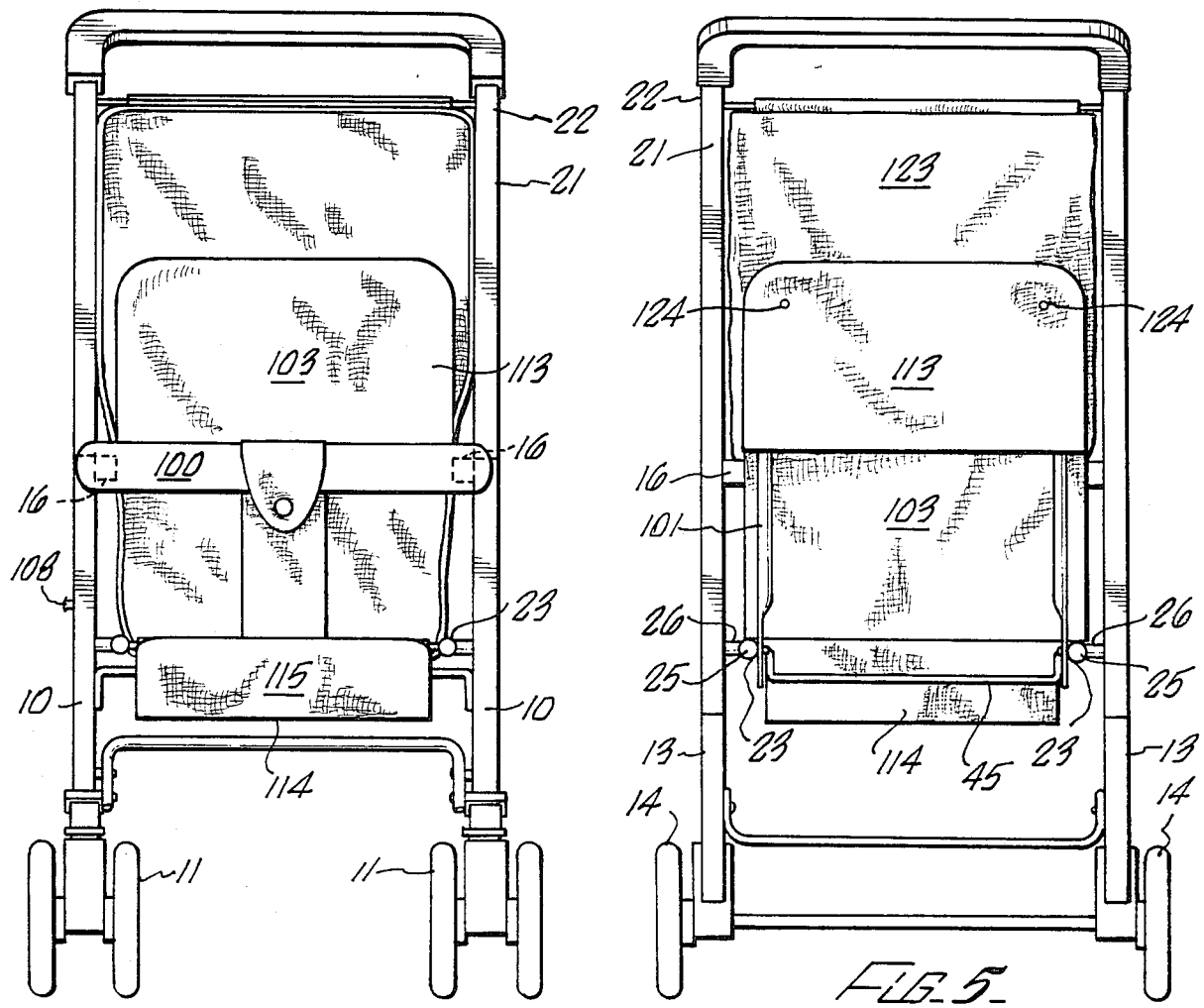
FIG. 4.
FIG. 5.

FOLDING TANDEM SEAT BABY CARRIAGE

BACKGROUND OF THE INVENTION

This invention relates to a foldable tandem seat baby carriage. In particular, the invention is concerned with a carriage having a construction for such a tandem seat arrangement which can be folded and unfolded with relative ease, no matter how many seats are mounted on the construction.

Many different styles and fabrications of baby carriage are available. Generally, baby carriages are made for single occupants and, therefore, have a single seat and backrest construction suitably mounted on legs relative to push handles. Different folding techniques are known to simplify the operation of the carriages.

It is also known to have tandem seat strollers and carriages; however, but the construction and mechanism of such strollers to permit for ease of operation and folding is relatively cumbersome and complicated. It is not known to have a tandem seat stroller which is easily operable and which has maximum flexibility for an extended bed construction. Moreover, it is essential in providing such a stoller, which of necessity is larger than a single seat carriage or stroller, to have a construction which is relatively light and easy to operate both in the extended operative position and also in the closed, folded position where simplicity of handling is desirable. At the same time, such a carriage should be sufficiently sturdy and stable given the increased size of multiple occupants.

There is, accordingly, a need to provide a tandem seat baby carriage which is of sturdy construction, is easy to operate in the extended position and is also easy to fold into the closed folded position.

SUMMARY OF THE INVENTION

The present invention provides a foldable tandem seat baby carriage which overcomes the disadvantages of conventional baby carriages and which meets the needs of a tandem carriage.

A foldable tandem seat baby carriage comprises a pair of front legs having wheels mounted towards the lower ends, a pair of rear legs have wheels mounted towards the lower ends, a first pair of longitudinal parallel bars extending between each respective front leg and rear leg pivotally mounted towards the upper ends of the respective front legs and rear legs. There is also a second pair of longitudinal parallel bars extending between each respective front leg and rear leg, and which is pivotally mounted at a location between the top and the bottom of the respective front legs and which is substantially parallel with the first longitudinal bars.

A substantially U-shaped push handle has free ends pivotally connected with the ends of the second pair of longitudinal bars remote from the front legs. Multiple tandem seats and backrests extend transversely between the first pair of parallel bars.

The backrests are pivotally adjustable and collapsible relative to the seats about a transverse pivot located substantially in line with the second pair of longitudinal parallel bars.

In an extended operative position, the first and second parallel bars are substantially horizontal. In a folded position, the legs fold towards each other and the parallel bars collapse and fold so that the backrest folds downwardly towards the respective seats between the collapsed parallel bars.

A transverse foot bar extending between the rear legs operates with an interengaging lock between the rear legs and the push handle to disengage the lock thereby to permit folding. On disengagement, under foot pressure, the downward pressure on the push handle causes a drawing-in action on the free ends of the front legs thereby to draw the parallel bars and legs into the folded position.

The above and other objects and advantages of the invention will be more readily apparent to those led in the art from the following detailed description in conjunction with the accompanying drawings which show one preferred embodiment of the invention.

BRIEF DESCRIPTION OF THE DRAWINGS

FIG. 3 is a partial side elevational view of the carriage in the unfolded operative position illustrating the cover material located on the frame, together with a canopy over the seats;

FIG. 4 is a front view of the carriage in the operative position;

FIG. 5 is a rear view of the carriage in the operative position.

PREFERRED EMBODIMENT OF THE INVENTION

Figure 1:
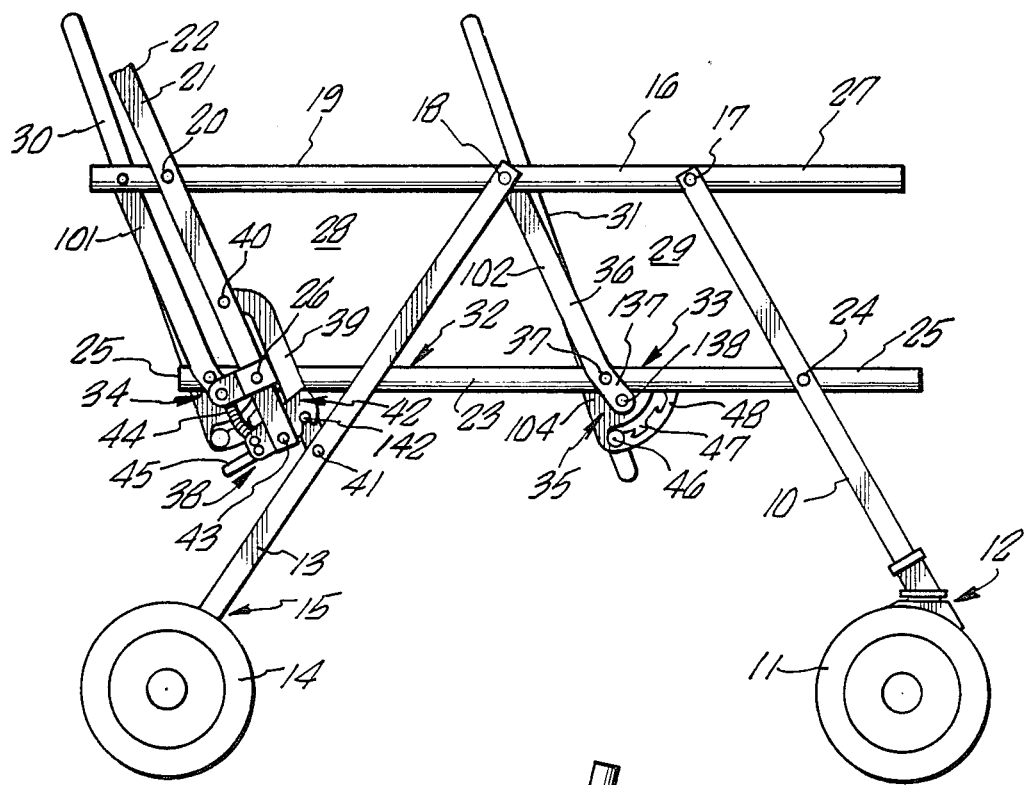
FIG. 1 is a side elevational view of the unfolded baby carriage showing the legs and bars constituting the frame in the operative position.
Figure 2:
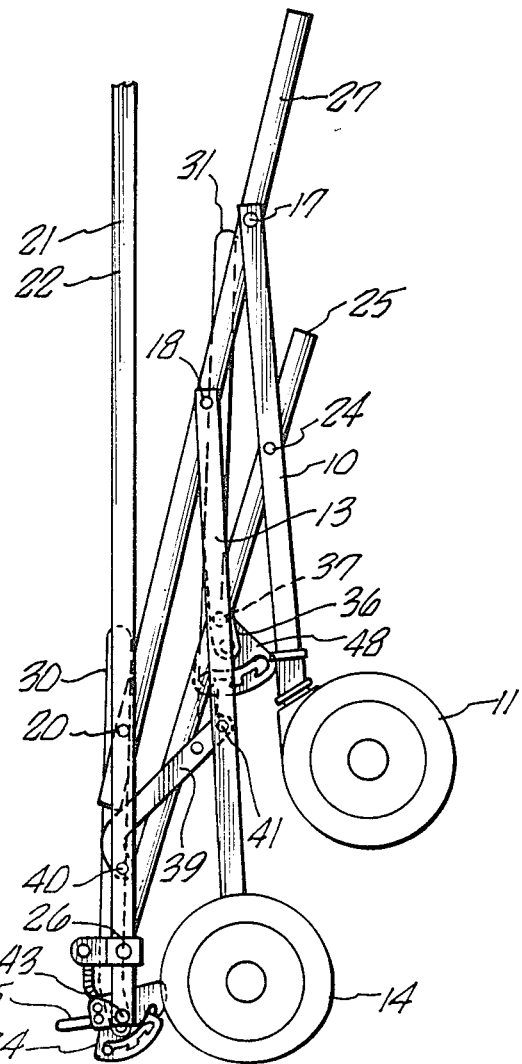
FIG. 2 is a side elevational view of the carriage showing the frame of the carriage in the collapsed and folded position.

A foldable tandem seat baby carriage comprises a pair of front legs 10 having wheels 11 mounted towards the lower end 12 of each of the legs 10. A pair of rear legs 13 has wheels 14 mounted towards the lower end 15 of each of the rear legs 13. A first pair of longitudinal parallel bars 16 extends between each respective front leg 10 and rear leg 13 so as to be pivotally mounted with the front legs at 17 and with the rear legs at 18. A rearward extension 19 of the first parallel bars 16 extend to a pivotal mounting 20 with the limbs 21 of a U-shaped push handle 22.

Below the first longitudinal bars 16 are a second pair of longitudinal parallel bars 23 which are substantially parallel to the bars 16 and pivotally mounted at 24 at about mid-length along the front legs 10. The ends 25 of the bars 23 are pivotally mounted at 26 with the free ends of the limbs 21 of the U-shaped push handle 22. This is at a position remote from the front legs 10.

The top longitudinal parallel bars 16 extend forwardly at 27 from the pivot 17 and include a transverse bar section 100 across the front of the carriage connecting the bars 16.

Multiple tandem seats 28 and 29 illustrated in FIG. 1 as two seats 32 and 33, extend between the first pair of parallel bars 16 with backrests members 30 and 31, respectively. The seats 32 and 33, respectively, are formed to lie substantially between the second pair of longitudinal bars 23. The backrests 30 and 31 are formed on frames 101 and 102 covered by a material 103, the material 103 linking the seat sections 32 and 33 with the backrest sections 30 and 31. The sections 30 and 31 have respective pivotal mounts 34 and 35 whereby the backrest sections 30 and 31 can be suitably adjusted and angulated relative to the seats 32 and 33 as desired.

An additional pair of support struts 36 are provided on each side of the carriage between a respective one of the upper parallel bars 16 and a respective one of the lower parallel bars 23. The support struts 36 are pivotally mounted at 18 with the upper parallel bar 16 and are pivotally mounted at 37 with the lower parallel bar 23.

In the extended operative position, the first and second parallel bars 16 and 32 are substantially horizontal. In a folded position, the legs 10 and 13 fold towards each other and the parallel bars 16 and 32 collapse and fold toward each other. The backrest frames 101 and 102 fold downwardly towards the respective seats 32 and 33 to be substantially between the collapsed parallel bars 16 and 32.

When the free ends of the U-shaped push handle 22 substantially abut the rear legs 13 at the mid-length of the rear legs, the carriage is in the operative position. A locking structure 38 includes a short limb 39 which is pivotally attached at 40 to at least one of the free ends of the U-shaped push handle 22 and at 41 to a point midway along the length of the rear leg 13. A hook limb 42 engages a protrusion or pin 142 extending transversely from the short limb 39. The hook limb 42 is pivotally mounted at 43 at the extreme free end of the push handle 22, and a spring 44 urges the hook 42 to remain in engagement with the protrusion 142.

A transverse bar 45 extending across the back of the carriage behind the rear legs 13 is operable under foot pressure against the spring 44 so as to release the hook limb 42 from the protrusion 142 and thereby unlock the structure 38 and carriage from its operative extended position. When this is done, a downward pressure on the push handle 22 causes the push handle 22 to move downwardly and the front legs 10 to move rearwardly towards the rear legs 13 and the rear legs 13 to move relatively forwardly towards the front legs 10. Simultaneously, the backrests 30 and 31 of the seats 28 and 29, respectively, move into a collapsed position forwardly to fold between the upper parallel bars 16 and the lower parallel bars 32. In the folded position, they close on the seats 32 and 33, respectively.

The bars 16 and 32 collapse about each other to be substantially parallel and closer together in the folded position. In this manner, the tandem seat carriage is easily operated under foot action and easy hand operation to close into the folded compact position.

Each of the backrests 30 and 31 includes substantially U-shaped frame members 101 and 102 parallel, in the open position to the inverted U-shape of the push handle 22. The free ends of members 101 and 102 have protrusions 46 which engage in a slot 47 in an angulated plate 104 mounted on the lower pair of parallel bars 32. The slot 47 is semicircular and contains cutout sections 48 into which the protrusion 46 can be located thereby to position the backrests 30 and 31, respectively at the desired position of recline. When the position of recline of the backrests 30 and 31 are substantially parallel to the push handle 22, folding is best effected to obtain the most compact collapsed and folded structure of the carriage.

The support struts 36 have a connection with the backrest frame 102 so that on folding as the struts 36 move towards the back legs 13 they cause the backrest 31 to move forwards and fold on the seat 33. This is effected by an extension 137 which is pivotally connected at 138 with the free end of the frame 102.

The appropriate stability for the carriage is obtained by having the front legs 10 extending slantingly relatively forward towards the wheels 11 and the rear legs 13 extending slantingly relatively backwards towards the wheels 14. The push handle 22 extends slantingly rearwardly when the carriage is in the operative position.

As best shown in FIG. 3, a catch 105 is mounted towards the top of the limb 106 of the inverted U-shaped push handle 22 and is hingedly formed with a slot 107 in its free end to receive a protruding stud in pin 108 on the outside face of the forward leg 10 so that in the collapsed, folded position, the push handle 22 can hold the carriage together in its folded and collapsed position. Release of the protrusion 108 from the slot 107 in the free end of the catch 105 permits for release and extension of the carriage to its extended, unfolded position. By fully urging the carriage open, the limb 42 will engage the protrusion 142 and thereby lock the carriage in the open position.

A snapped-on fabric material 109 is placed over the top of the first and upper pair of parallel bars 16 to provide sides 210 to each of the tandem seats 29 and 29 of the carriage. The snapped-on fabric material 109 has pushed button snaps 111 which interengage so as to secure the material in place. A separate material length 110 constitutes the forward seat 29 and another separate material length 109 constitutes the rear seat 28. Snaps 112 are provided to interlink the forward seat 29 and rear seat 28. In certain desired operations, the forward seat fabric material 110 and/or rear seat material 109 can be removed from the frame 16 and unsnapped at 112 from its adjacent seat 28 or 29, as the case may be. The removal of the snapped-on material lengths 109 and 110 acts to remove only only the sides 210 but also the seat portions 32 and 33 which is formed to be integral with the sidewalls 210 and the lengths of fabric material 109 and 119 which are formed to be integrally part of the backrest formations 103. The backrests 30 and 31 are constituted by frame elements 101 and 102 which fit within a pocket 113 in the rear of the backrest sections 103 of each of the seats 28 and 29. In this manner, the material for each seat and backrest can be removed for cleaning. The backrests 30 and 31 can be moved to a substantially horizontal position to extend the carriage seats into a bed as required. With the backrest 30 inclined and the backrest 31 extended substantially horizontally and an effective bed is obtained for the carriage.

Each of the seats 28 and 29 has a foot rest structure 114, the footrests 114 being pivotally mounted between the lower parallel bars 32 on a transverse bar 49. Each footrest 114 includes a frame structure 114 over which a fabric material 115 is located and removably snapped into position. A second transverse bar 116 mounted pivotally from the front legs 10 below the parallel bars 32 for movement to interengage the frame structure 114 so that the footrest structure 114 in front of the carriage can be located at different reclining positions. A similar transverse bar 117 is mounted between the lower parallel bar 32 ahead of the hinge point 49 to permit the rear footrest 114 to be adapted to the requisite inclined position. In this fashion, the two footrests 114 are independent of the seats 28 and 29 while being located appropriately below the seats 28 and 29 to be effective rests for the feet of babies and children in the carriage.

Also provided for the carriage is a removable and foldable canopy 118 which is affixed to the carriage framework by means of a transverse bar 119 near the top of the push handle 22. This bar 119 operates with a U-shaped transverse extension bar 120 hingedly mounted at 121 at the rear of the upper parallel bars 16 rearwardly of the hinged points 20. This bar 120 can extend forwardly over the parallel bars 16 thereby to extend the fabric material 122 of the canopy 118 over the carriage. A drop length of fabric material 123 is snap connected at 124 with the rear of the backrest 30 to provide a rear protection the carriage. The canopy 118 can be folded backwards as indicated by the phantom lines 125 in a position to abut the push handle 22.

The wheels 11 and 14 have appropriate shock-absorbing characteristics in their mountings and can have brake elements provided to prevent undesired rotation of the wheels.

The invention has been described with reference to an embodiment with two seats and backrests in tandem. Clearly, other embodiments can exist with multiple tandem seats, for instance, three or four, as may be desired. The invention provides for a foldable baby carriage which is convenient for the user to use and is sufficiently sturdy by virtue of the two sets of parallel bars 16 and 32, which extend laterally and horizontally forward in use to provide sufficient rigidity to the structure. Similarly, the interaction of the legs, parallel bars, and push handle is of a nature that when unlocked, folding is easily effected by downward action on the push handle which causes a collapsed and folding retraction of the legs 10 and 13 towards each other with the parallel bars 16 and 32 closing together. In the folded position, there is a balance achieved between the floor engaging section of the wheels 14 and the lock arrangement 38 so as to provide an upright balance to the carriage.

While only one embodiment of the invention has been shown and described in detail, it will be understood that this is for illustration purposes, and the scope of the invention is to be determined according to the appended claims.

What is claimed:

1. A foldable tandem baby carriage comprising a pair of front legs having wheels mounted at the lower ends, a pair of rear legs having wheels mounted at the lower ends, a first pair of parallel bars extending between each respective front leg and rear leg and pivotally mounted near the upper ends of the respective front leg and rear leg, a second pair of parallel bars extending between each respective front leg and rear leg and pivotally mounted between the top and the bottom of the front leg, the second pair of parallel bars being substantially parallel with the first pair of bars and in an operational position below the first pair, a substantially U-shaped push handle, said push handle having free ends, the free ends of said handle being pivotally connected near the ends of the second pair of bars remote from the front legs, a transverse bar extending between the rear legs and interengaging a lock between the rear legs and the push handle, the transverse bar being operable for disengaging the lock thereby to permit folding, a plurality of tandem seats and backrests extending completely between the pairs of bars, the backrests being connected to the second pair of longitudinal parallel bars so as to be pivotally collapsible relative to the seats about a transverse pivot, wherein in an extended operational position, the first and second parallel bars are substantially horizontal, and in a folded position the legs fold towards each other, the first and second pairs of parallel bars fold together, and the backrests fold downwardly towards the respective seats between the folded parallel bars.

2. A baby carriage as claimed in claim 1 wherein the free ends of the push handle substantially abut the rear legs at substantially mid-length the rear legs.

3. A baby carriage as claimed in claim 1 including struts extending between a respective bar of the first pair of parallel bars and the respective bar of the second pair of parallel bars, the struts being pivotally mounted relative to the parallel bars wherein in the extended operative position the struts are forwardly extended and in the folded position the struts are adjacent the rear legs.

4. A carriage as claimed in claim 3 wherein in the operative extended position, the front legs extends forwards towards the wheels, the rear legs extends slantingly relatively backwards towards the wheels and the push handle extends slantingly rearward relative to the posterior of the carriage.

5. A carriage as claimed in claim 1 wherein the transverse bar is operative under foot pressure to disengage the lock and wherein downward pressure on the push handle and drawing-in action on the wheel ends of the front legs acts to draw the parallel bars and legs into the folded position.

6. A carriage as claimed in claim 5 including a catch for holding the push handle together with at least one of the front legs in the folded position.

7. A carriage as claimed in claim 6 including snapped-on material placed on the first pair of parallel bars to provide sidewalls for the seats.

8. A carriage as claimed in claim 1 wherein the seats and backrests include frames with removable material on the frames.

9. A carriage as claimed in claim 1 wherein the backrests are collapsible forwardly, with respect to the upper portion of the backrest, and rearwardly, with respect to the lower portion of the backrest, relative to the seats.

10. A carriage as claimed in 1 including footrests mounted ahead of and below the seats, the footrests being mounted transversely between the second pair of parallel bars.

11. A carriage as claimed in claim 7 including a foldable canopy removably mounted on the push handle.

12. A carriage as claimed in claim 1 wherein at least part of at least one of the seats or backrests is removable thereby to provide for a bed.

13. A carriage as claimed in claim 1 including a cross bar mounted between anterior terminations of the first parallel bars, said cross bar being mounted anterior to the pivot mounting the front legs and being integral with the first parallel bars.

14. A foldable tandem baby carriage comprising a pair of front legs having wheels mounted at the lower ends, a pair of rear legs having wheels mounted at the lower ends, a first pair of longitudinal parallel bars extending between each respective front leg and rear leg and pivotally mounted near the upper ends of the respective front leg and rear leg, a second pair of longitudinal parallel bars extending between each respective front leg and rear leg and pivotally mounted between the top and the bottom of the front leg, the second pair of parallel bars being substantially parallel with the first pair of parallel bars and in an operational position below the first pair, a substantially U-shaped push handle, said push handle having ventral free ends, said free ends of the handle being pivotally connected near the end of the second pair of longitudinal bars remote from the front legs, a transverse foot bar extending between the rear legs and interengaging a lock between the rear legs and the push handle, the transverse foot bar being operable for disengaging the lock thereby to permit folding, the lock including a short limb pivotally connected between said free ends of the push handle and the rear legs, the short limb having a pin for cooperation with a slotted hook limb attached to the transverse bar, a plurality of tandem seats and backrests extending completely between the first pair of bars from the front to the back, the backrests being connected to the second pair of longitudinal parallel bars so as to be pivotally adjustable and collapsible relative to the seats about a transverse pivot, said pivots being located on the second pair of longitudinal parallel bars, wherein in an extended operational position the first and second parallel bars are substantially horizontal and in a folded position, the legs fold towards each other, the first and second pairs of parallel bars collapse together, and the backrests fold downwardly towards the respective seats between the collapsed parallel bars.

15. A carriage as claimed in claim 14 including footrests mounted ahead of and below the seats, the footrests being mounted transversely between the second pair of parallel bars.

16. A carriage as claimed in claim 15 including snapped-on material placed on the first parallel bars to provide sidewalls for the carriage, the snapped-on material forming part of seats and backrests for each seat and being adapted to snap together so as to be selectively separable.

17. A carriage as claimed in claim 16 wherein the seats and backrests include frames with removable material on the frames.

18. A baby carriage as claimed in claim 17 wherein struts extends respectively between the pivot mounting of the top of each rear leg with the first pair of longitudinal bars and the respective bar of the second pair of parallel bars, the struts being pivotally mounted relative to the second parallel bars and being pivotally mounted about the first parallel bar, wherein in the extended operative position the struts are forwardly extended and are substantially parallel with the front legs, and in the folded position the struts are adjacent the rear legs.

19. A foldable tandem baby carriage comprising a pair of front legs having wheels mounted at the lower ends, a pair of rear legs having wheels mounted at the lower ends, a first pair of longitudinal parallel bars extending between each respective front leg and rear leg and pivotally mounted near the upper ends of the respective front leg and rear leg, a second pair of longitudinal parallel bars extending between each respective front leg and rear leg and pivotally mounted between the top and the bottom of the front leg, the second pair of parallel bars being substantially parallel with the first pair of parallel bars and in an operational position below the first pair, a substantially U-shaped push handle, said push handle having ventral free ends, said free ends of the handle being pivotally connected with the ends of the second pair of longitudinal bars remote from the front legs, a plurality of tandem seats and backrests extending between the first pair of bars from the front to the back, the backrests being connected to the second pair of longitudinal parallel bars so as to be pivotally adjustable and collapsible relative to the seats about a transverse pivot, said pivots being located on the second pair of longitudinal parallel bars, wherein in an extended operational position, the first and second parallel bars are substantially horizontal and in a folded position, the legs fold towards each other, the first and second pair of parallel bars collapse together, and the backrests fold downwardly towards the respective seats between the collapsed parallel bars, struts extending respectively between the pivot mounting of the top of each rear leg with the first pair of longitudinal bars and the respective bar of the second pair of parallel bars, the struts being pivotally mounted relative to the second parallel bars, and being pivotally mounted about the first parallel bar wherein in the extended operative position, the struts are forwardly extended and are substantially parallel with the front legs and in the folded position the struts are adjacent the rear legs, a transverse foot bar extending between the rear legs and interengaging a lock between the rear legs and the push handle, the transverse foot bar being operable for disengaging the lock thereby to permit folding on downward pressure of the push handle and raising of the parallel bars towards the push handle.

20. A carriage as claimed in 19 including footrests mounted ahead of and below the seats, the footrests being mounted adjustably and transversely between the second pair of parallel bars.

21. A foldable tandem baby carriage comprising a pair of front legs having wheels mounted at the lower ends, a pair of rear legs having wheels at the lower ends, a first pair of parallel bars extending between each respective front leg and rear leg and pivotally mounted near the upper ends of the respective front leg and rear leg, a second pair of parallel bars extending between each respective front leg and rear leg and pivotally mounted between the top and the bottom of the front leg, the second pair of parallel bars being substantially parallel with the first pair of parallel bars, and in an operational position below the first pair, a substantially U-shaped push handle having free ends, the free ends of the handle being pivotally connected near the ends of the second pair of bars remote from the front legs, a plurality of tandem seats and backrests extending completely between the pairs of bars, the backrests being connected to the second pair of longitudinal parallel bars so as to be pivotally collapsible relative to the seats about a transverse pivot, wherein in an extended operational position, the first and second parallel bars are substantially horizontal, and in a folded position, the legs fold towards each other, the first and second pair of parallel bars fold together, and the backrests fold downwardly towards the respective seats between the folded parallel bars, struts extending between a respective bar of the first pair of parallel bars, and the respective bar of the second pair of parallel bars, the struts being pivotally mounted relative to the parallel bars wherein in the extended operative position the struts are forwardly extended and in the folded position the struts are adjacent the rear legs and the struts cooperate with at least one of the backrests to cause the backrest to fold downwardly when in the folded position.

22. A carriage as claimed in claim 21 wherein the strut cooperates with a forwardly located backrest.

* * * * *